United States Patent [19]

Suzuki et al.

[11] Patent Number: 4,905,153

[45] Date of Patent: Feb. 27, 1990

[54] SYSTEM AND METHOD FOR AUTOMATICALLY CONTROLLING A VEHICLE SPEED TO A DESIRED CRUISING SPEED

[75] Inventors: Koichi Suzuki; Kiyoshi Konishi; Eisaku Hori, all of Kanagawa, Japan

[73] Assignee: Nissan Motor Company, Limited, Yokohama, Japan

[21] Appl. No.: 190,078

[22] Filed: May 4, 1988

[30] Foreign Application Priority Data

Jun. 5, 1987 [JP] Japan .................................. 62-139997

[51] Int. Cl.[4] ............................................. B60K 31/04
[52] U.S. Cl. ........................... 364/426.04; 364/431.07; 123/352; 180/179
[58] Field of Search ...................... 364/426.04, 431.07; 123/352; 180/170, 176, 179

[56] References Cited

U.S. PATENT DOCUMENTS

| | | | |
|---|---|---|---|
| 4,598,370 | 7/1986 | Nakajima et al. | 364/431.07 |
| 4,650,020 | 3/1987 | Mizuno et al. | 364/426.04 |
| 4,707,792 | 11/1987 | Naito | 123/352 |
| 4,723,213 | 2/1988 | Kawata et al. | 364/426.04 |
| 4,725,969 | 2/1988 | Onogi et al. | 364/431.07 |
| 4,735,273 | 4/1988 | Naito | 364/431.07 |
| 4,739,485 | 4/1988 | Hayashi | 364/431.07 |

FOREIGN PATENT DOCUMENTS 61-129338  6/1986  Japan .

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired vehicle speed in which, when a set switch is operated, a vehicle speed $V_1$ at the time of the predetermined set storage unit of microcomputer and a limit vehicle speed switch operation is stored in a vehicle speed $V_{alpha}$ is set which is lower than the stored vehicle speed by a predetermined value alpha ($V_{alpha} = V_1$-alpha, alpha$>$0). The limit vehicle speed $v_{alpha}$ is a criterion of determining if a second initialize control should be executed. The second initialize control is such that an acceleration command signal is intermittently outputted to a throttle actuator until the deceleration of the vehicle becomes below a constant rate upon detection of a change rate of the vehicle speed after a first initialize control in which the acceleration command signal is outputted for a predetermined period of time upon receipt of a cruise command signal from a command switch. The limit speed is set to a value considerably close to the stored vehicle speed. When the actual vehicle speed $V_0$ immediately after the first initialize control has a value larger than the limit speed $V_{alpha}$, the following inequalities are established: $V_{alpha} < V_0 < V_1$ ... (1) or $V_1 V_0$ ... (2) In either case (1) or (2), the second initialize control is inhibited. Thereafter a cruise speed control is carried out.

10 Claims, 5 Drawing Sheets

SYSTEM AND METHOD FOR AUTOMATICALLY CONTROLLING A VEHICLE SPEED TO A DESIRED CRUISING SPEED

BACKGROUND OF THE INVENTION (1) Field of the Invention

The present invention relates to a system and method for automatically controlling a vehicle speed to a desired cruising speed applicable to vehicles.

(2) Background of the Art

A Japanese Patent Application First Publication (Nonexamined) sho No. 61-129338 published on June 17, 1986 exemplifies an automatic vehicle speed controlling system.

The automatic vehicle speed controlling system disclosed in this Japanese Patent Application Publication includes (a) a vehicle speed sensor for generating a signal in proportion to the vehicle speed, (b) a command switch operable by an operator for generating and outputting a cruise command signal, (c) vehicle speed storage means for storing the vehicle speed at a time when the command switch is operated and the cruise command signal is outputted, (d) a throttle actuator for driving he throttle valve in response to an input command signal, (e) a first controller for outputting an acceleration command signal to the actuator for a predetermined period when the cruise command signal is outputted, (f) a second controller for monitoring a change rate of the vehicle speed with time after a first initialize control by means of the first controller and intermittently outputting the acceleration command signal to the throttle actuator until a rate of deceleration of the vehicle equals to or below a constant value, (g) a third controller for producing an acceleration or deceleration command signal to the throttle actuator in correspondence with a difference between the actual vehicle speed and stored vehicle speed so that the vehicle speed coincides with the stored vehicle speed.

The second controller operates after the above-described first initialize control has been carried out by means of the first initialize controller. The third controller operates after the first and second initialize controls of the first and second controllers.

When a set switch in the command switch is changed from the on state to the off state, the system is activated so that a first initial control signal $S_1$ is outputted from the first initial controller for the predetermined period of time. If a mounting state of the throttle actuator is even and precise in each vehicle, a vehicle speed control at an initial stage is sufficient to settle the vehicle speed at the stored vehicle speed only by means of the series (first and second) of initialize controls.

However, since the throttle actuators are usually mounted in uneven manners for different vehicles (for example, wires for connecting the actuators to the throttle valves often become too loose for different vehicles), the initial vehicle speed control is ended after the further output of the acceleration command signal (second initialize control signal) $S_2$ until the deceleration rate of the corresponding vehicle falls below the constant rate in order to eliminate vehicle speed errors due to the mounting errors described above. Thereafter, the vehicle speed is maintained constant, outputting acceleration and deceleration command signals $S_3$ and $S_4$ (cruise control signals) for the vehicle acceleration or deceleration according to the difference between the actual vehicle speed $V_0$ and stored vehicle speed $V_1$.

The reason for requiring the series or initialize controls is that the deceleration control for the vehicle speed is carried out in the above-described automatic vehicle speed controlling system when the set switch is in the on state. When the vehicle speed is changed from the deceleration state to the cruising state, a predetermined acceleration control for the vehicle speed, i.e., the series of vehicle speed initialize controls is needed.

It is noted that the command switch includes an acceleration switch operable by the operator for accelerating the vehicle at a constant acceleration and a resume switch operable by the operator for reducing the vehicle speed after a brake operation is carried out and returning the vehicle speed to the originally stored vehicle speed, other than the set switch.

However, in the automatic vehicle speed controlling system disclosed in the above-identified Japanese Patent Application Publication, the second initialize control is always carried out if the deceleration value exceeds the predetermined value, even if the difference between the actual vehicle speed and stored vehicle speed is extremely small after the first initial control by means of the first controller is completed.

Although the series of the initialize controls are measures adopted to eliminate unevenness of the mounting state of the individual throttle actuators as described above, a smooth change of the vehicle speed to the cruising speed cannot be made due to the unstable abrupt transfer from the deceleration to the acceleration of the vehicle speed if the second initialize control is carried out by means of the second initialize controller when the difference between the actual vehicle speed and stored vehicle speed is small.

SUMMARY OF THE INVENTION

It is, therefore, an object of the present invention to provide a system and method for automatically controlling a vehicle speed to a desired cruising speed which smoothly transfer the vehicle speed to the cruising speed at an initial stage of the vehicle speed control.

The above-described object can be achieved by providing a system for automatically controlling a vehicle speed to a desired cruising speed, comprising: (a) first means for detecting a vehicle speed; (b) second means operable by an operator for outputting a cruise command signal; (c) third means for storing the vehicle speed in response to the cruise command signal derived by the second means; (d) fourth means for controlling a speed of an engine in response to an input command signal; (e) fifth means for carrying out a first initialize control such that an acceleration command signal is outputted to the fourth means for a predetermined period of time in response to the cruise command signal derived by the second means; (f) sixth means for monitoring a change rate of the vehicle speed with time during a transient response immediately after the first initialize control of the vehicle speed is carried out by means of the fourth means and carrying out a second initialize control such that the acceleration command signal is intermittently outputted to the fourth means until the change rate of the vehicle speed becomes below a predetermined rate; (g) seventh means for carrying out a cruise control such as to control the fourth means so that a difference between the vehicle speed and stored vehicle speed is reduced; (h) eighth means for setting a limit speed which is lower by a predetermined value than the stored vehicle speed; and (i) ninth means for inhibiting an operation of the sixth means when the vehicle speed is greater than the limit speed.

The above-described object can also be achieved by providing a system for automatically controlling a vehicle speed to a desired cruising speed, comprising: (a) first means for detecting an actual vehicle speed; (b) second means for storing a vehicle speed when a set switch is operated; (c) a throttle actuator for driving a throttle valve independently of a vehicle accelerator; (d) third means for carrying out a first initialize control such that an acceleration command signal is produced and outputted for a predetermined period of time to the throttle actuator when the set switch is operated; (e) fourth means for monitoring a change rate of the vehicle speed when a transient response is carried out immediately after the vehicle speed control by means of the third means is carried out and for intermittently outputting the acceleration command signal to the throttle actuator until the rate of deceleration is below a constant rate; (f) fifth means for controlling an opening angle of a throttle valve so as to return a difference between the actual vehicle speed and stored vehicle speed, (g) sixth means for setting a limit speed which is lower by a predetermined value than the stored vehicle speed;and (i) seventh means for inhibiting an operation of the fourth means when the vehicle speed is larger than the limit speed when the operation of the fourth means is completed.

The above-described object can also be achieved by providing a method for automatically controlling a vehicle speed to a desired vehicle speed, comprising the steps of: (a) detecting a vehicle speed; (b) determining whether a set switch provided for operatively commanding an automatic vehicle speed controlling system to carry out the vehicle speed control to the desired cruising speed is operated; (c) storing the vehicle speed detected in the step (a) as a target cruise speed when the set switch is turned on and thereafter the set switch is turned off; (d) carrying out a first initialize control such that an acceleration command signal is outputted to engine speed controlling means for a predetermined period of time when the set switch is turned on and thereafter turned off; (e) carrying out a second initialize control such that when the actual vehicle speed is lower than the stored vehicle speed by a predetermined value and a rate of deceleration is equal to or greater than a constant value upon completion of the step (d); and (f) carrying out a cruise speed control such that a difference between the vehicle speed and the stored vehicle speed is reduced upon completion of either the step (d) or step (e) which is determined depending on whether the actual vehicle speed is lower than the stored vehicle speed by the predetermined value.

BRIEF DESCRIPTION, OF THE DRAWINGS

Figure 1:
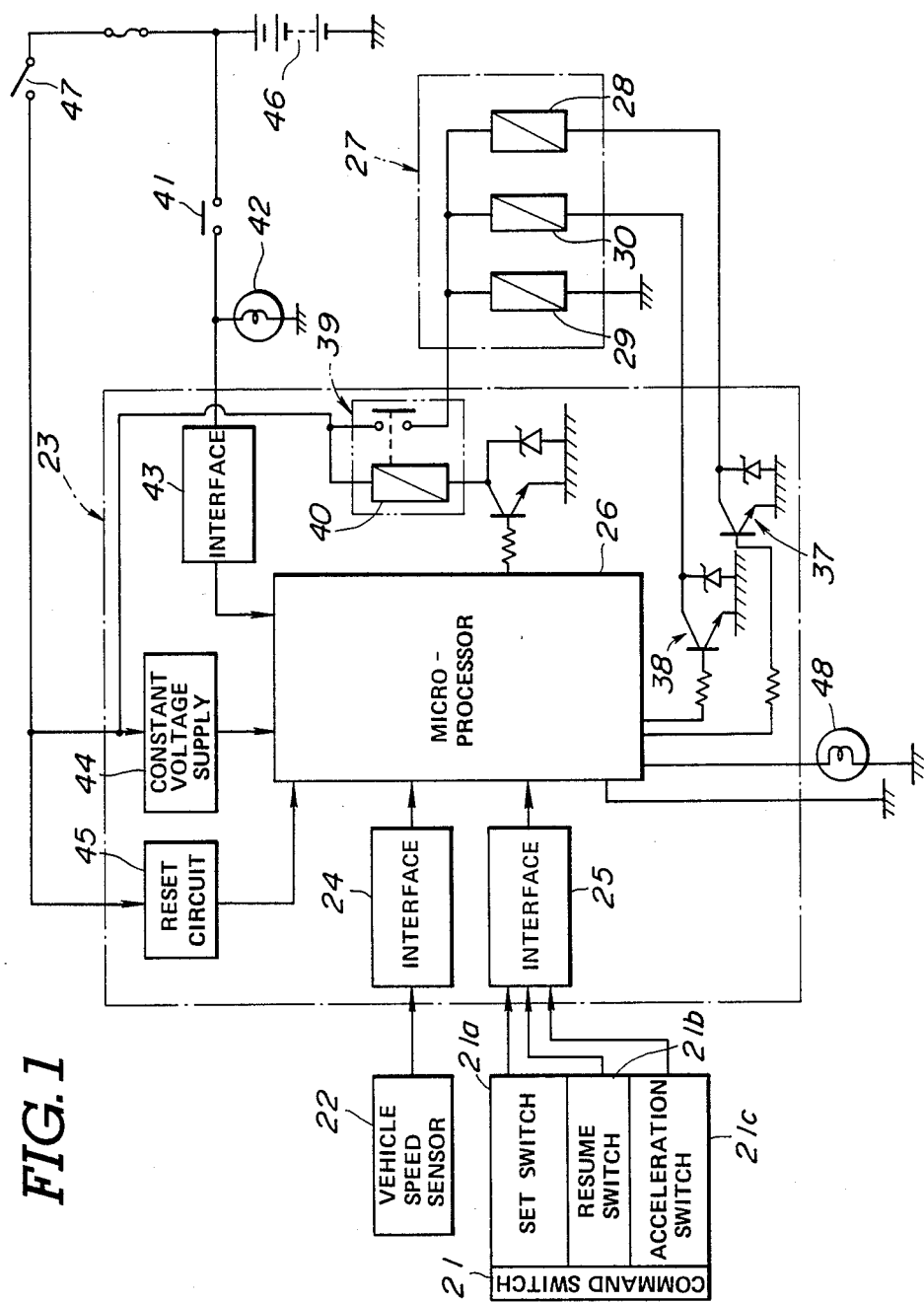
FIG. 1 is a schematic circuit block diagram of an automatically vehicle speed controlling system in a preferred embodiment according to the present invention.
Figure 2:
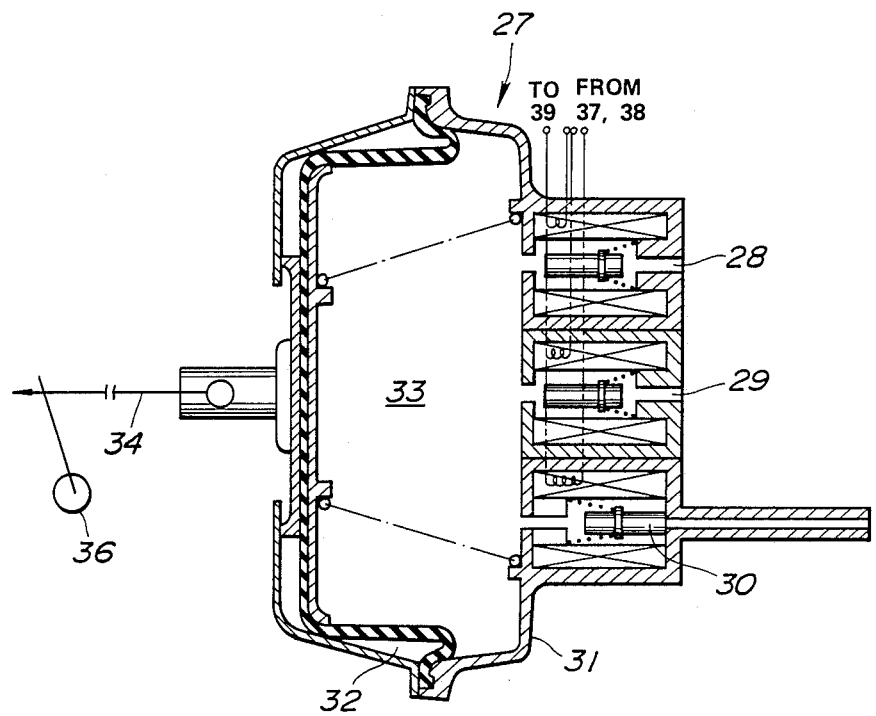
FIG. 2 is a schematic cross sectional view of a throttle actuator shown in FIG. 1.
Figure 4A:
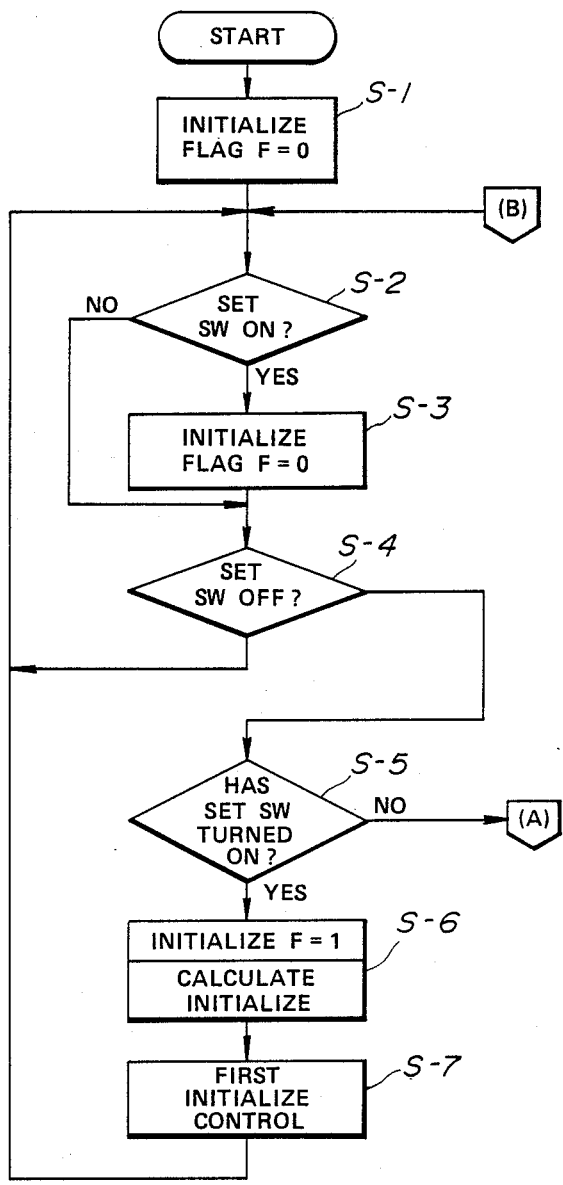
Figure 4B:
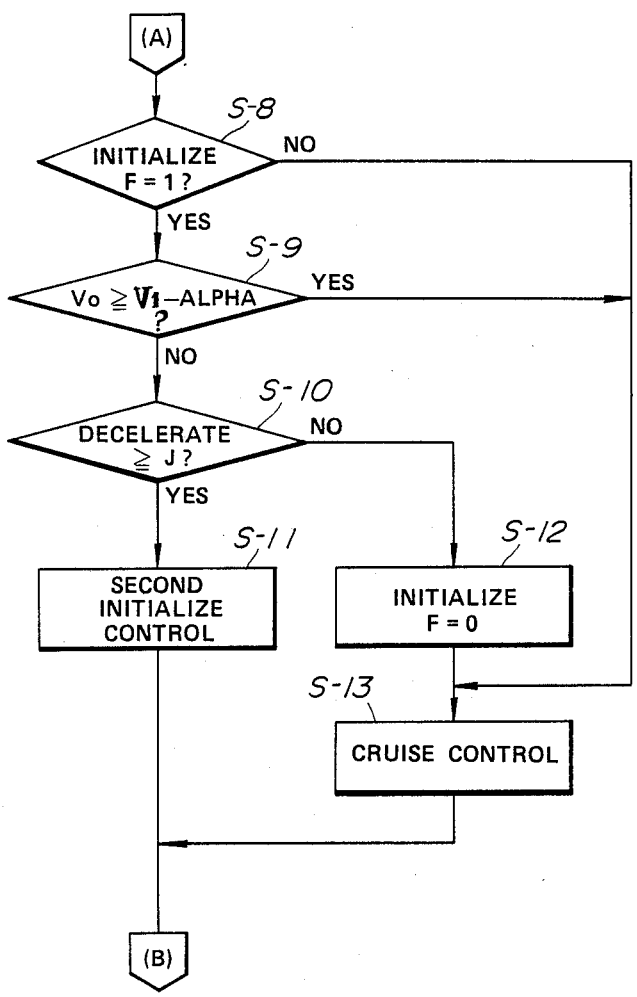

FIGS. 4(a) and 4(b) are operational flowcharts for explaining the operation of a microprocessor shown in FIG. 1.

DETAILED DESCRIPTION OF THE PREFERRED EMBODIMENT

Reference will hereinafter be made to the drawings in order to facilitate understanding of the present invention.

FIG. 1 shows a construction of an automatically controlling a vehicle speed to a desired cruising speed in a preferred embodiment according to the present invention.

The same construction as FIG. 1 is exemplified by a U.S. patent applications Ser. No. 035,355 filed on Apr. 7, 1987, Serial No. 043,532 filed on Apr. 28, 1987, and 061,295, filed on June 12, 1987, the disclosures of which ar hereby incorporated by reference.

In FIG. 1, a command switch group 21 includes a set switch 21a, a resume switch 21b, and an acceleration switch 21c. The cruise command signals derived from the command switch group 21 are supplied to a microprocessor 26 via an interface 25.

A speed indicative signal is derived via an interface 24 from a vehicle speed sensor 22.

A throttle actuator 27 includes a vent valve 28, a safety valve 29, and vacuum valve 30. Each of the vent valve 28 and the safety valve 29 has one end exposed to the atmosphere.

One end of the vacuum valve 30 is connected to an intake manifold (negative pressure chamber). The other ends of each valve 28, 29, and 30 are communicated with a negative pressure chamber 33 formed on either side of a casing 31 and a diaphragm 32. The other side of the diaphragm 32 is connected to one side of the control wire 34. The other end of the control wire 34 is linked with a valve axle 36 of the throttle valve.

Furthermore, numerals 37 and 38 denote valve switching stages for controlling on and off stages of the vent valve 28 and vacuum valve 30. Numeral 39 denotes an actuator switching stages for controlling on and off stage of the throttle actuator 27 according to the output of the microprocessor 26. The power supply, at this time, is coupled via a relay 40. Numeral 41 denotes a brake switch and numeral 42 denotes a brake lamp. A signal for cancelling the system when the brake operation is carried out is inputted to the microprocessor 26 via the interface 43 in the controller 23.

Furthermore, numeral 44 denotes a constant voltage regulator, numeral 46 denotes a power supply such as a vehicle battery, numeral 47 denotes a main switch for the controller 23, and numeral 48 denotes a cruise lamp.

Figure 3:
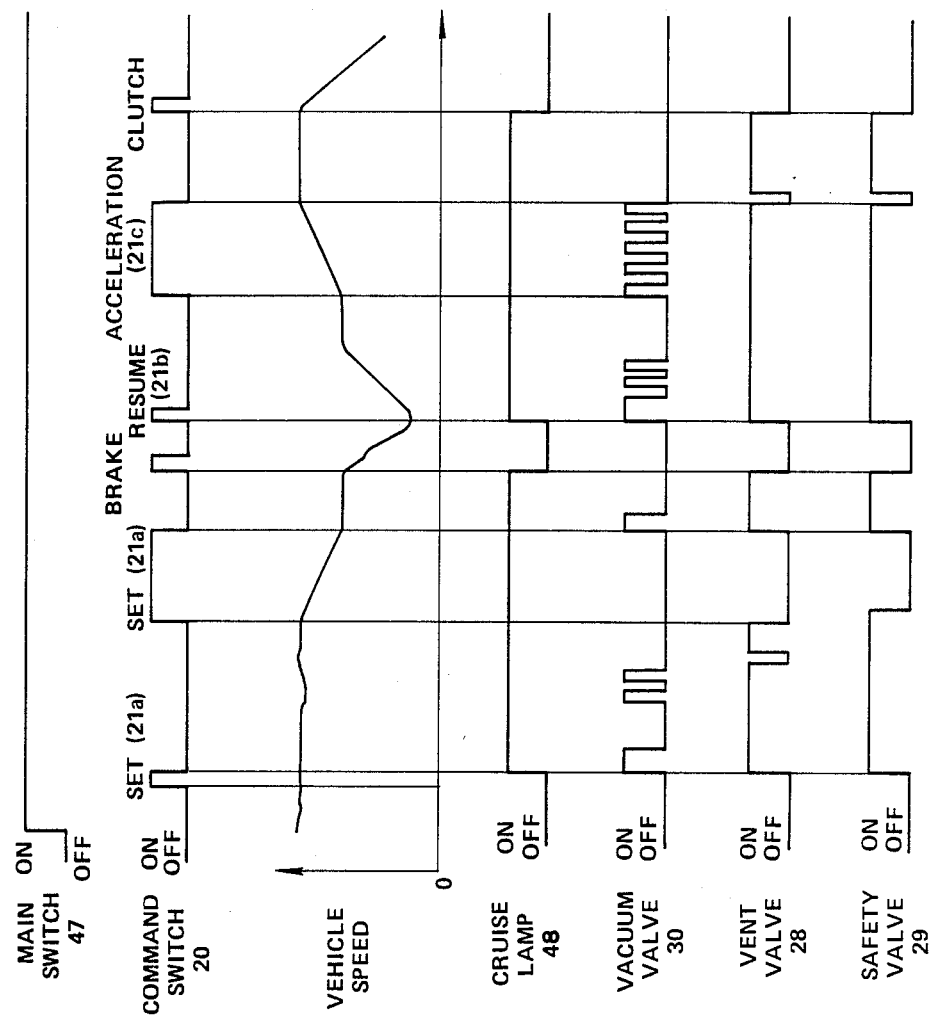
FIG. 3 is a timing chart of signals for explaining operation of the system shown in FIG. 1.

An operation of the preferred embodiment will be described with reference to FIGS. 3, 4(a) and 4(b).

First, the main switch 47 is turned on to actuate the automatic vehicle speed controlling system in the preferred embodiment. The vehicle speed sensor 22 outputs pulses in proportion to the actual vehicle speed, the pulse signal being supplied to a microprocessor 26 subjected to a sampling for a constant period of time. The number of pulses proportional to the vehicle speed are always recognized by means of the microprocessor 26. Under such a condition as described above, when the set switch 21 of the command switch group 20 is turned from the on state to the off state, the cruise lamp 48 is illuminated to indicate the start of the system. At this time,. the number of pulses according to the vehicle speed are stored in a storage part of the microprocessor 26. Simultaneously, the control program shown in FIGS. 4(a) and 4(b) is executed.

An acceleration operation control is carried out, with the vent valve 28 and safety valve 29 being closed to block the negative pressure chamber 33 from the atmosphere and with the vacuum valve 30 being open to introduce negative pressure into the negative pressure chamber 33, so that the control wire 34 is drawn to the right toward the throttle actuator 27 to open the throttle valve. On the other hand, a deceleration operation control is carried out with the vacuum valve 30 being closed, either the vent valve 28 or safety valve 29 being opened to the left to the atmosphere, so that the control wire 34 is returned to close the throttle valve via the throttle axle 36.

In FIGS. 4(a) and 4(b), the microprocessor 26 resets an initialize flag in a step S-1. The microprocessor 26 determines whether the set switch 21 is turned ON in a step S-2. Immediately after start of the system operation, the set switch 21 is tuned OFF so that the routine goes from a step S-4 to a step S-5. The microprocessor 26 determines whether the set switch 21 has once been turned to ON in the step S-5.

If the set switch 21 has been turned ON at the previous processing, the initialize flag F is set ('1') and the initialize calculation is carried out in which the vehicle speed detected by the vehicle speed sensor 22 is stored in a storge unit of the microprocessor 26 in a step S-6 since the present time is the processing immediately after the system operation is started.

The acceleration command signal is outputted on the basis of the value derived in the step S-6 in the first initialize control for a predetermined period of time in a step S-7. In the step S-5 in which the set switch 21 at the previous time has been turned OFF, the microprocessor 26 determines whether the initialize flag F has been turned to either "1" or "0" in a step S-8.

When the initialize flag F indicates "1", the microprocessor 26 determines whether the actual vehicle speed $V_0$ is larger than a limit speed ($V_1$-alpha) in a step S-9. If $V_0 \geq V_1$-alpha, the cruising speed control is carried out w the second initialize control in a step S-13. If $V_0 < V_1$-alpha, the microprocessor 26 determines whether the deceleration of the vehicle is below a predetermined rate J in a step S-10.

If the deceleration rate is below the predetermined rate J, the microprocessor 26 resets the initial flag F to "0" to carry out the cruising speed control ((S-12)–(S-13)). If the deceleration rate $\geq$ J, the second initialize control is carried out to reduce the rate of deceleration and the routine returns to restart the control program shown in FIGS. 4(a) and 4(b).

Although in the preferred embodiment the negative-pressure actuating type throttle valve actuator 27 is used as means for actuating the throttle valve 35, another type of throttle actuator using a motor can be applied.

As described hereinabove, since in the automatic vehicle speed controlling system according to the present invention, the second initialize control is carried out only in a case when the actual vehicle speed $V_0$ is smaller than the limit speed ($V_1$-alpha) and the deceleration rate is above the constant rate. The cruising speed control is immediately carried out when the difference between the actual vehicle speed and the stored vehicle speed is small after the first initialize control. Consequently, the smooth transfer from the deceleration control to the cruising speed control can be achieved.

It will fully be appreciated by those skilled in the art that the foregoing description is made in terms of the preferred embodiment and various changes and modifications can be made without departing from the scope of the present invention which is to be defined by the appended claims.

What is claimed is:

1. A system for automatically controlling vehicle speed to a desired cruising speed, comprising:
   (a) first means for detecting a vehicle speed;
   (b) second means operable by an operator for outputting a cruise command signal;
   (c) third means for storing said vehicle speed in response to said cruise command signal outputted by said second means;
   (d) fourth means having an actuator for controlling an operating variable of an engine driving force adjusting mechanism in response to said cruise command signal;
   (e) fifth means for carrying out a first initialize control such that an acceleration command signal is outputted from said fifth means for a predetermined period of time in response to the cruise command signal outputted by said second means;
   (f) sixth means for monitoring a change rate of said vehicle speed with time during a transient response immediately after said first initialize control is carried out by said fifth means via said fourth means and carrying out a second initialize control via said fourth means such that said acceleration command signal is intermittently outputted to said fourth means until the change rate of said vehicle speed becomes lower than a predetermined rate;
   (g) seventh means for carrying out a cruise control such as to control said fourth means so that a difference between said vehicle speed an said stored vehicle speed is reduced;
   (h) eighth means for setting a limit speed which is lower by a predetermined value than said stored vehicle speed; and
   (i) ninth means for inhibiting an operation of said sixth means when said vehicle speed is larger than said limit speed.

2. A system as set forth in claim 1, wherein said seventh means carries out said cruise control after said first and second initialaize controls are carried out when said vehicle speed is equal to or lower than said stored vehicle speed.

3. A system as set forth in claim 1, wherein the seventh means carries out said cruise control when said vehicle speed is larger than said stored vehicle speed.

4. A system as set forth in claim 1, wherein said fourth means includes a throttle valve located in a throttle chamber of the engine, a diaphragm having a pressure chamber, and a wire connected between said throttle valve and said pressure chamber, and means for varying an opening angle of said throttle valve in accordance with said acceleration command signal.

5. A system as set forth in claim 1, wherein said limit speed is set to a value near said stored vehicle speed.

6. A system as set forth in claim 1, wherein said seventh means monitors the acceleration of the vehicle and carries out said second initilalize control when the rate of deceleration becomes lower than a constant value.

7. A system for automatically controlling vehicle speed to a desired cruising speed, comprising:
   (a) first means for detecting an actual vehicle speed;
   (b) second means for storing a vehicle speed when a set switch is operated;

(c) a throttle actuator for driving a throttle valve independently of a vehicle accelerator;

(d) third means for carrying out a first initialize control such that an acceleration command signal is produced and outputted for a predetermined period of time to said throttle actuator when said set switch is operated;

(e) fourth means for monitoring a change ate of said vehicle speed when a transient response is carried out immediately after the vehicle speed control by said third means is carried out and for intermittently outputting said acceleration command signal to said throttle actuator until the rate of deceleration is below a constant rate;

(f) fifth means for controlling an opening angle of said throttle valve so as to reduce the difference between said actual vehicle speed and said stored vehicle speed;

(g) sixth means for setting a limit speed which is lower by a predetermined value than said stored vehicle speed; and (h) seventh means for inhibiting an operation of said fourth means when said vehicle speed is larger than said limit speed when the operation of said fourth means is completed.

8. A method for automatically controlling a vehicle speed to a desired vehicle speed, comprising the steps of:

(a) detecting a vehicle speed;

(b) determining whether a set switch provided for operatively commanding an automatic vehicle speed controlling system to carry out the vehicle speed control to the desired cruising speed is operated;

(c) storing said vehicle speed detected in step (a) as a target cruise speed when said set switch is turned on and thereafter said set switch is turned off;

(d) carrying out a first initialize control when an acceleration command signal is outputted to engine speed controlling means for a predetermined period of time when said set switch is turned on and thereafter turned off;

(e) carrying out a second initialize control when the actual vehicle speed is lower than said stored vehicle speed by a predetermined value and a rate of deceleration is equal to or greater than a constant value completion of step (d); and (f) carrying out a cruise speed control when a difference between said vehicle speed and said stored vehicle speed is reduced upon completion of either step (d) or step (e) which is determined depending on whether said actual vehicle speed is lower than said stored vehicle speed by a predetermined value.

9. A method as set forth in claim 8, wherein step (f) is carried out subsequent to step (d) without carrying out the step (e) when said actual vehicle speed is larger by said predetermined value than said stored vehicle speed.

10. A method as set forth in claim 8, wherein step (f) is carried out after step (d) and subsequent to step (e) when said actual vehicle speed is lower than said stored vehicle speed by said predetermined value.

* * * * *